(12) United States Patent
Ruby

(10) Patent No.: US 7,775,088 B2
(45) Date of Patent: Aug. 17, 2010

(54) ATOMIC FORCE MICROSCOPE TIP ARRAYS AND METHODS OF MANUFACTURING SAME

(76) Inventor: Brian Ruby, 2400 Eliott Ave., Apt. 210, Seattle, WA (US) 98121

( * ) Notice: Subject to any disclaimer, the term of this patent is extended or adjusted under 35 U.S.C. 154(b) by 451 days.

(21) Appl. No.: 11/647,911

(22) Filed: Dec. 30, 2006

(65) Prior Publication Data

US 2007/0261480 A1 Nov. 15, 2007

Related U.S. Application Data

(60) Provisional application No. 60/755,495, filed on Dec. 31, 2005.

(51) Int. Cl.
*G01B 5/28* (2006.01)
(52) U.S. Cl. .......................................................... 73/105

(58) Field of Classification Search ................... 73/105
See application file for complete search history.

(56) References Cited

U.S. PATENT DOCUMENTS

| 4,916,002 A | * | 4/1990 | Carver | 216/11 |
| 5,372,930 A | * | 12/1994 | Colton et al. | 850/59 |
| 7,281,419 B2 | * | 10/2007 | Wang et al. | 73/105 |

* cited by examiner

*Primary Examiner*—Hezron Williams
*Assistant Examiner*—Alex Devito
(74) *Attorney, Agent, or Firm*—Dilworth Paxson LLP

(57) ABSTRACT

The present invention provides methods and apparatus for forming an array of multiple nanotube tips that can be utilized with AFM technology. The multiprobe tips may be independently modified or specifically left unmodified. Software can generate a composite image of data collected from two or more of the independently modified and unmodified tips.

5 Claims, 6 Drawing Sheets

ATOMIC FORCE MICROSCOPE TIP ARRAYS AND METHODS OF MANUFACTURING SAME

CROSS REFERENCE TO RELATED APPLICATIONS

This application claims priority to Provisional Application Ser. No. 60/755,495 filed Dec. 31, 2005 and entitled "Atomic Force Microscope Tips Arrays and Methods for Manufacturing Same." The contents of which are relied upon and incorporated herein by reference.

BACKGROUND

This invention relates generally to novel Atomic Force Microscope (AFM) tips and methods of using the novel AFM tips. In particular the present invention relates to arrays of AFM tips and methods and systems for manufacturing the same.

Modern scientific devices include technology which use extremely sharp tips and low forces to characterize the surface of a sample. In some cases, the characterization can be accomplished at atomic dimensions in which cases scanning probe microscopes (SPMs), such as the atomic force microscope (AFM), are used. Generally, the tip of AFM probe is introduced to the sample surface to detect changes in the characteristics of the sample. Automated processes track relative scanning movement between the tip and the sample, surface characteristic data are thereby acquired over a particular region of the sample and a corresponding map of that region of the sample is generated on a computer simulation.

An AFM microscope typically scans the tip, while keeping the force of the tip on the surface of the sample generally constant. This is accomplished by moving either the sample or the probe assembly up and down generally perpendicularly to the surface of the sample in response to a deflection of a cantilever included in the probe assembly as the probe is scanned across the surface of the sample. Data thereby generated from the vertical motion can be stored in data processing apparatus and then used to construct a simulated image of the surface of the sample.

In some specific measurement methods, a tip is oscillated at or near a resonant frequency of the associated cantilever of the probe. The amplitude or phase of this oscillation is kept constant during scanning using feedback signals, which are generated in response to tip-sample interaction. Feedback signals can collected by automated data processing techniques, and stored thereby representing a characterization of the sample.

The deflection of the cantilever in response to the probe tip's interaction with the sample is measured with a deflection detector, such as an optical lever system. In such optical systems, a lens can be employed to focus a laser beam, from a source typically placed overhead of the cantilever, onto the back side of the cantilever. A reflective portion fixed to the lever such that a beam may be reflected from the reflective portion towards a photodetector. The translation of the beam across the photodetector during operation can thereby provide a measure of the deflection of the lever, and, therefore also provide a simulation of one the sample. In some instances, an AFM probe tip can also be modified with a ligand of interest prior to the scan.

However, as effective as the AFM techniques may be, the process is generally tedious and heretofore it has been very difficult, if not essentially impossible, to exactly replicate a condition under which a first scan has been performed a first ligand and a subsequent scan performed with a different ligand. In some instances, it may be possible to utilize a midstream probe switch, however this process is very complicated and difficult to precisely replicate.

According to some studies, the average cost of bringing a drug from pencil and paper through FDA approval may be as high as $800 million and take about 15 years. A significant portion of this time and money can be spent identifying suitable drug candidates, wherein many drug candidates are tested and explored utilizing, amongst other tests, the AFM techniques described above, but eventually abandoned.

Therefore it would be useful to have a development process and technology, wherein researchers may streamline research and development via advanced structural and chemical analysis of biological samples and in particular, proteins. Such a development process and technology would not only be useful to allow for the more rapid development and testing of promising compounds, but may also be useful to rule out compounds which are inappropriate, much faster than is currently possible.

SUMMARY

Accordingly, the present invention provides methods and apparatus enabling a multiprobe AFM which can be utilized for advanced sample analysis, including, in some embodiments, analysis performed with each AFM tip individually treated. The individually treated AFM tips which make up the multiprobe AFM can then simultaneously access an analyzed compound thereby assuring identical conditions during analysis.

The present invention provides carbon nanotube devices which contains at least two carbon nanotube tips, and to a method of manufacturing such a carbon nanotube devices. More particularly, in some embodiments, the present invention provides methods of manufacturing a carbon nanotube device including an array of AFM tips or a multiprobe AFM. In some embodiments, one or more of the probes which make up the array can be modified for a particular purpose.

Other embodiments of the present invention can include a computerized system, executable software, or a data signal implementing the inventive methods of the present invention.

Various features and embodiments are further described in the following figures, drawings and claims.

DETAILED DESCRIPTION

The present invention provides methods and apparatus related to multiprobe tips that can be utilized with AFM technology. Methods of manufacture of multiprobe tips are presented as well as unique designs of multiprobe AFM tips and applications for their use. The multiprobe tips may be independently modified or specifically left unmodified. In some embodiments, low-angstrom resolution protein structures are generated, including, in some implementations, under native state conditions.

The present invention provides devices that can generate angstrom level protein structures with minimal sample preparation and, in addition, create an enabling technology platform that combines a chemical analysis and structural analysis of the same protein.

DEFINITIONS

"Carbon Nanotube" refers to a carbon nanostructure in a generally cylindrical shape with a diameter of approximately 1 nanometer (Nm) and carbon faces of fullerene type hexagon meshes generally or almost parallel to the axis of the tube. Variants of the cylindrical carbon nanostructures, around which amorphous carbon exists, are also included in the carbon nanotube.

"CVD" refers to Chemical Vapor Deposition;
"DRIE" refers to deep reactive ion etch.
"Ligand" refers to constituents in bodily fluids, cell extracts, and tissue extracts for which there is present, or can be formed, a reaction partner. Ligands can include, by way of non-limiting example: antigens, antibodies, amides, amino acids, peptides, proteins, lipoproteins, glycoproteins, sterols, steroids, lipoids, nucleic acids, enzymes, hormones, vitamins, polysaccharides, and alkaloids.

"NMR" refers to nuclear magnetic resonance.
"PDMS" refers to Poly(dimethylsiloxane)
"SWNT" refers to single walled nanotubes meaning carbon nanotubes having a structure generally with a single hexagon mesh cylinder or tube.

"TRPC" refers to transient canonical receptor potential channels.

Overview

The present invention provides methods and apparatus which allows atomic force microscopy to be utilized to create 3-dimensional images of structures under native state conditions and also provide structural analysis of samples that cannot be easily analyzed by traditional means such as: crystallographic methods or routine NMR.

One or more SWNT's are attached to the end of a conventional silicon tip for the study of receptor proteins. The extremely small diameter of the nanotubes provides imaging probe functionality capable of accurate reproduction of the sample analyzed. In some embodiments, the SWNT's can be attached to a silicon tip for the purpose of studying proteins under fluid conditions.

Figure 1:
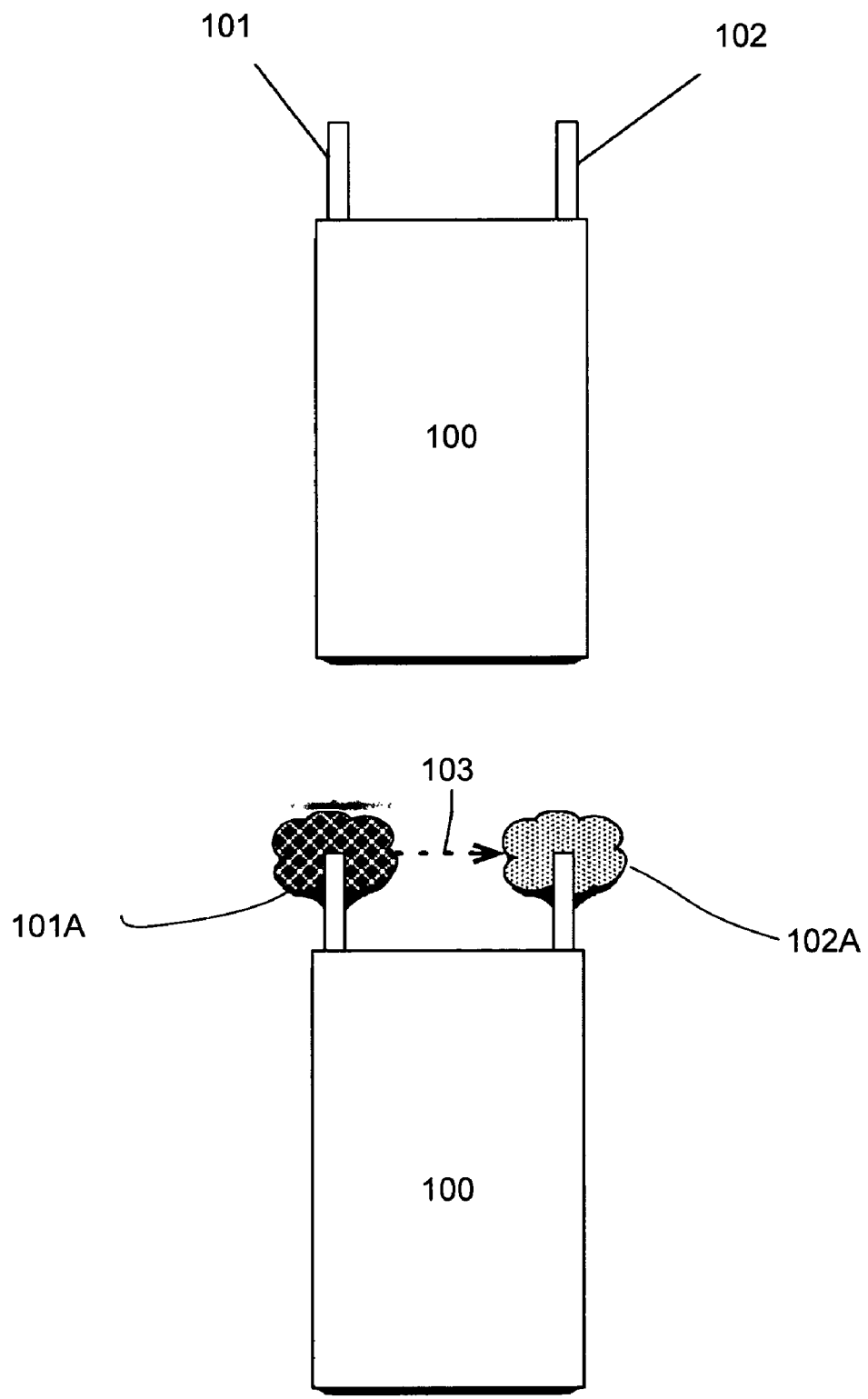
FIG. 1 illustrates a block diagram of an AFM chip with multiple tips.

Referring now to FIG. 1, an AFM chip 100 is illustrated with two or more cantilevers with nanostructure tips, such as, for example SWNT tips 101-102. In some embodiments, imaging can be performed with a probe including the AFM chip and two or more SWNT tips, wherein one or more of the multiple SWNT tips 101-102 remains an unmodified tip 101A and one or more of the SWNT probes 101-102 is a modified tip 102A. In some embodiments, during lateral movement 103, the cantilever positions remain fixed.

In some embodiments, the multiple SWNT probes 101-102 are suitable for chemical modification and their subsequent application for the construction of color-scaled 3-D chemical affinity maps. Moreover, the image data allows researchers or other users to infer quantitative information about the binding forces between a probe 101-102 and the sample.

According to the present invention, a combination of both a traditional topographical, non-chemically sensitive 3-D image with a chemically sensitive image wherein both images have lateral and vertical resolutions on the order of 200 Å or less, are captured under native state conditions, and require little to no sample preparation.

In some embodiments, obtaining a composite image allows for rapid, binding pocket structural analysis, as well as quantitative affinity measurements of a particular ligand. Subsequent to an image being obtained, experimentation can proceed in at least one of two ways, including: a) different ligands tested to identify for secondary binding interactions, or to identify several different ligands that might bind a primary binding pocket; and b) known stimuli for the receptor of interest (electrical, inhibitory, etc) can be applied wherein subsequent composite images are then created. In some embodiments of the second methodology it is possible to not only map a structural change of a binding pocket in lieu of the stimulus, but also to analyze quantitatively how the binding affinity for the ligand changes with the stimulus. In addition, it is within the scope of the present invention to combine both methodologies thereby allowing a researcher to rapidly gain insight into a primary binding of a given ligand and also better understand the ligand's larger role in a particular pathway by direct observation of secondary events, such as, for example, binding and release.

According to the present invention, creation of composite images is facilitated by the use of a minimum of two carbon nanostructures, such as AFM tips 101-102. As discussed above, one tip 101-102 can be chemically modified 102A with the ligand of interest, and one that is not 101. Unlike previously known microscopy protocols, according to the present invention it is not necessary to change the probes 101-102 to facilitate a composite image creation. The present invention provides versatile and accurate methods for using two different tips 101-102 to image a single sample subject.

The present invention, utilizes the high precision of the piezoelectric stage; with relatively closely spaced tips and lateral movement of a stage under the probes with nanometer precision, the same sample (i.e. a single receptor protein) can be imaged by both probes 101-102.

An advantage to the multi-probe setup 100-102 according to the present invention, is that only a very limited knowledge of a sample is needed to precisely analyze it. For example, if a particular ligand interacts with a receptor protein on the cell surface, it is possible to use the chemically modified probe 102A to isolate a single receptor on the cell. The single receptor can then be imaged using the unmodified probe 101 to get a larger structural image.

A composite image generated by a multiprobe AFM tip 100-102 may yield several different aspects of information, including, by way of non-limiting example: structural information about a receptor; how well a particular ligand binds to a receptor; and details related to spatial orientation of a binding pocket within the receptor. Some of this information can be collected under native state conditions. AFM tips can include, for example, carbon nanotube AFM tips, which can be manufactured, for example, according to the methods taught in WO 2005/046305, which is incorporated herein by reference in its entirety.

The present invention can include utilizing any of the methods and devices described herein to: study biological materials, including proteins, that cannot be observed by x-ray crystallography or nuclear magnetic resonance (NMR) techniques; to study ligand-receptor interactions; to study membrane-bound proteins; to study any biological receptor protein; to study transient canonical receptor potential channels (TRPC); to study the Opiod receptor; and to find a mixed agonist/antagonist for the Opiod receptor. In some preferred embodiments, the biological samples are studied under native state conditions and at low angstrom resolution levels, including levels, for example of less than 200 Å.

Data from the unmodified probe 101 can also be integrated with each of the modified probes 102 into 3-dimensional composite images that contain angstrom level chemical and structural information. In some embodiments, a device 100-103 can include only two probes 101-102, one modified 101 and the other unmodified 102. Other embodiments can include three or more probes each individually modified or left unmodified.

Figure 5:
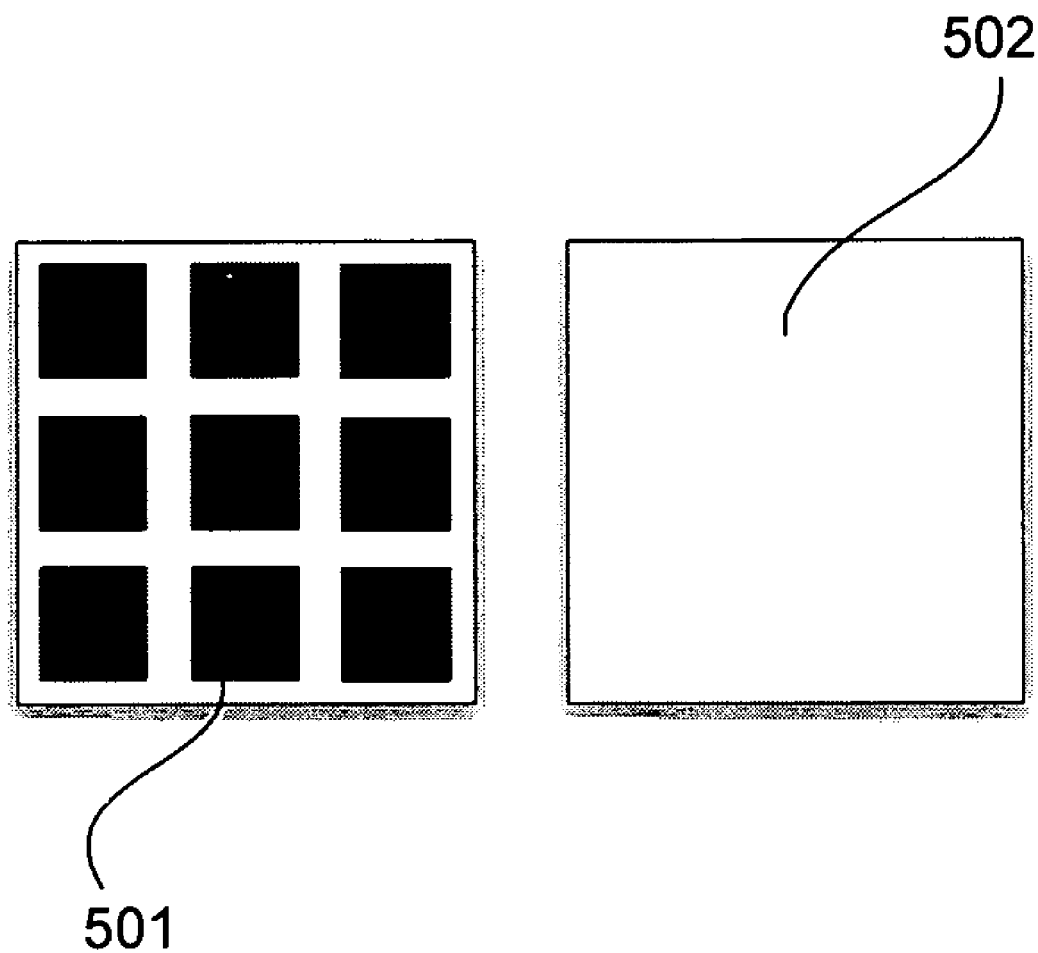
FIG. 5 illustrates images generated by an unmodified tip and a modified tip of a patterned surface assembled monolayer.

In FIG. 5, image 501 illustrates an image generated by a modified tip of a patterned surface assembled monolayer, and image 502 illustrates an image generated by an unmodified tip of a patterned surface assembled monolayer.

There are many methods of fabricating nanotube tips, one preferred method according to the present invention includes first creating an underlying silicon pyramid on a suspended cantilever. The underlying silicon pyramid can be created using photolithography and silicon bulk micromachining. A second tip and cantilever is added with photomasks utilized to define the shape of a cantilever and a pyramid. The photomasks therefore define two cantilevers and pyramids rather than just one of each.

A carbon nanotube is then attached to the silicon pyramid. The carbon nanotube can be attached, for example using CVD in which a carbon feedstock gas flows at high temperature (800-900° C.) across a transition metal catalyst. A catalyst is deposited through spin-coating or some other means onto the silicon pyramid. A pyramid is then brought to high temperature in a CVD reactor oven and the carbon feedstock gas is passed through the oven. Catalyst materials such as one or more of a combination of and Cobalt molybdenum or Fe-derived compounds (iron oxide, iron-platinum oxide, iron-molybdenum oxide, etc.) can be utilized with a feedstock gas such as a light alkane (i.e. methane) or an alcohol.

Figure 2:
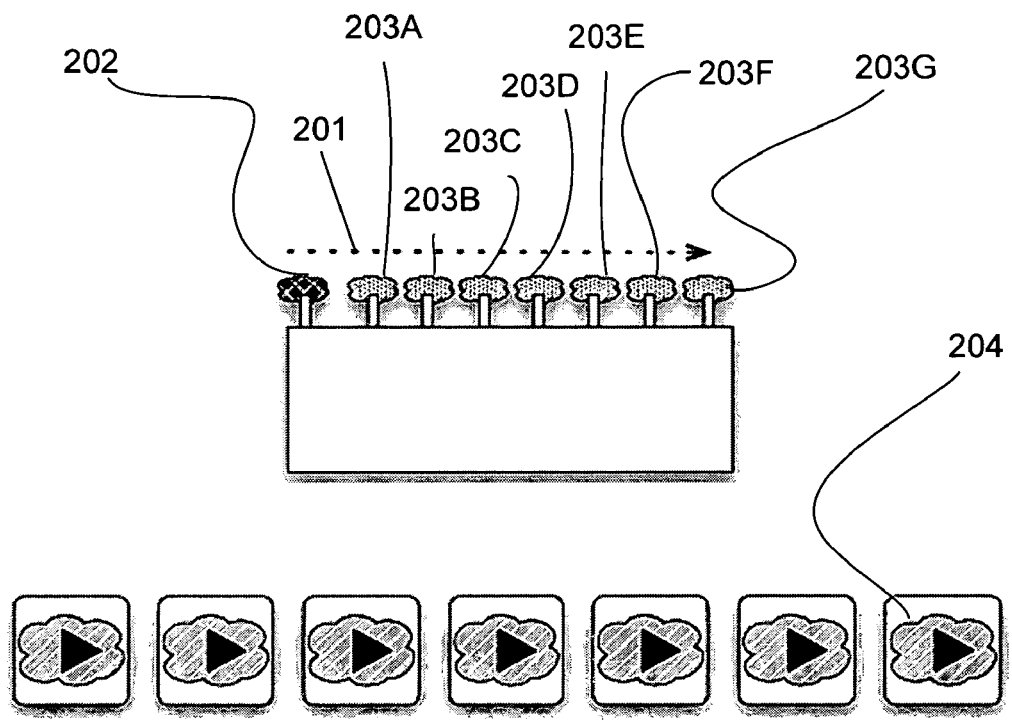
FIG. 2 illustrates an array of tips individually modified.

Referring now to FIG. 2, another aspect of the invention includes modifying multiple tips 203A-G with a microfluidics apparatus which enables each single probe 203A-G to be selectively modified.

Fluid flows to the surface of one of the tips 203A-G to selectively modify that particular tip 203A-G. The droplet of fluid is preferably small enough to immerse only one of the two tips present. Microfluidics is used to direct the fluid towards the tip 203A-G by capillary action. The use of microfluidics can provide for one or both of subsequent micro reaction and mixing of several fluids, in some preferred embodiments, solutions can be pre-mixed as is diagrammed in FIG. 3A. Fluid can be injected upstream by micropipette into larger wells 303, where the fluid will proceed down a channel of much smaller diameter to a microwell 302, 305 into which the probe will be "dipped."

An AFM device containing multiple tips 203A-G (sometimes herein referred to as an "array") can also include alignment marks inscribed on a back side which correlate with marks on an underlying fluid flow apparatus (sometimes herein referred to as a "nanodip"). The nanodip and the array will fit together using a male and female coupling connection at the two alignment marks, making convenient coupling possible using a low-power optical microscope (or high-power magnifying glass) and a pair of tweezers. The alignment marks on the nanodip can essentially function as tiny elevators, which will allow movement along the z-axis and as such also enable dipping of the tips into the microwells 302, 305 and also foster raising of the tips 203A-G back out of the microwells, thus allowing a user to remove an array 202, 203A-G, with tweezers and transfer it to an AFM.

Accordingly, in some embodiments, a simplified procedure can include four straightforward steps and can be carried out initially under observation via low magnification, or in some embodiments with sophisticated fiber-optic cameras monitoring each step for display on a computer display. The steps can include: align an array and the nanodip; inject fluid into selected macro-wells; dip the tips into the microwells for a set amount of time before raising them back up; and remove the array for use.

Figure 4:
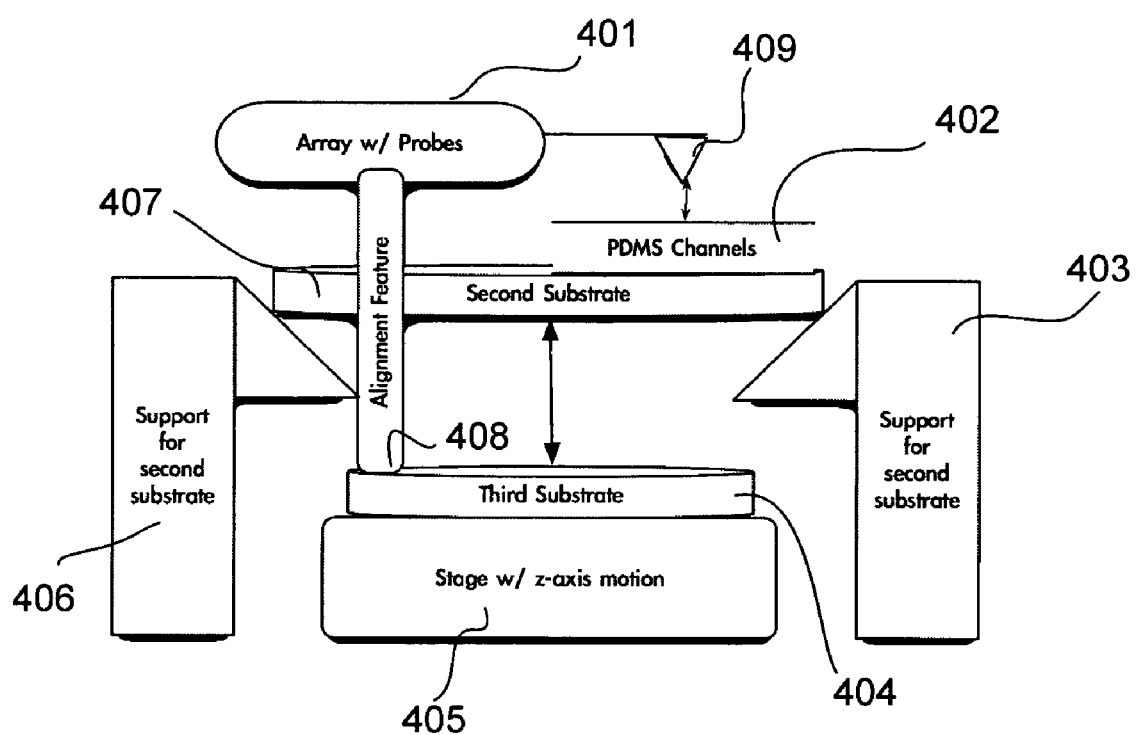
FIG. 4 illustrates a block diagram of a cross section of an array of probes in relation to a substrate.

Referring now to FIG. 4, in some embodiments, fabrication of a nanodip is accomplished by engineering PDMS microfluidic channels 402. The following exemplary steps can be used to make the PDMS channels 402: after a positive photoresist is patterned on a silicon wafer, a positive relief structure is added; PDMS is then applied over the positive relief structure to create a mold; the PDMS is peeled away and brought into contact with a second silicon substrate 407 sufficient to serve as a support structure for the nanodip. Before contact is made, both the PDMS mold and the silicon substrate are exposed to oxygen plasma. Upon contact, an irreversible seal is created, which leaves an intact and leak-free channel 402 and well structures.

An alignment feature 408 can be fabricated by etching through the entirety of the second silicon substrate using a deep reactive ion etch ("DRIE"). The etch is used to form a hole in the substrate with vertical sidewalls. Similar to the channel fabrication, a positive relief structure is fabricated onto a third silicon substrate 404 that is complementary to the alignment feature 408. However, the relief structure in the third substrate 404 is made of silicon, via another DRIE step, rather than photoresist. This third substrate 404 will rest on a motorized stage 405 capable of motion in a z-axis. It is the third substrate 404, when combined with the second substrate 407, which will provide the ability to dip an array of probes 401 the tips into the microwell (not shown in FIG. 4). Thus the second substrate 407 will be suspended by independent supports 403, 406. In some embodiments, an alignment feature 408 is fabricated before the microchannels are constructed, thereby preventing the PDMS from having to undergo the process of photolithography, resist development, and DRIE.

In another aspect, it can be seen that one probe can be selectively functionalized. Some embodiments can include the surface which is patterned with two different alkenethiol self-assembled monolayers (SAMs). The alkenethiol chains will be of the same length and will only differ by the surface termination group: HS—$(CH_2)_6$—$R_1$ versus HS—$(CH_2)_6$—$R_2$. From the perspective of the AFM, the two different SAMS will be topographically flat . . . only a chemically modified probe will be able to discern the difference between the SAMs.

An alternating pattern of methyl terminated SAMs can be constructed using elastomeric PDMS stamped onto a gold substrate, in a series of alternating lines or squares. Bare regions of the gold substrate can be exposed to an ethanol solution of 6-Amino-1-hexanethiol hydrochloride (Dojindo Molecular Technologies). On top of the bare regions the amino terminated SAMs will form. In some embodiments, preparation for introduction of the nanotube tips can generally be accomplished via a process including: etching the nanotubes in air at high temperature to generate exposed free carboxyl groups at the tube ends; incubating in a solution comprising 50 mM EDC (1-ethyl-3-(3-dimethylaminopropyl) carbodiimide hydrochloride (Pierce) 5 mM of benzylamine in 0.1M MES (2-[N-morpholino]ethanesulphonic acid) buffer pH 6.0 (Sigma) for 2 hours at room temperature; and successive rinses in 0.1M MES, 0.1M NaCl, and deionized water.

A prepared array can be used to image a prepared SAM pattern in a simple test. In some embodiments, an unmodified probe will not expose the pattern whereas the modified tip will.

In some embodiments, as a control procedure, a verification that free carboxyl groups exist at nanotube ends can be conducted. Carboxyl groups can be subjected to deprotonation above a certain pH. If the adhesion force is measured between the tip and a hydroxyl-terminated SAM, there should exist a clear drop in adhesion above a certain critical pH, at which the carboxyl group will become deprotonated. Because the imaging will be taking place in a fluid cell, a titration can be setup and, by monitoring the adhesion forces on the tip, an adhesion force versus pH curve can be plotted. If the tip does not show the appropriate drop in adhesion force, then it can be concluded that free carboxyl groups do not exist at the end of the nanotube.

The hydroxyl-terminated SAM can be fabricated by exposing a silicon substrate coated with a gold thin film to an ethanol solution of 6-Hydroxy-1-hexanethiol (Dojindo Molecular Technologies).

Figure 3:
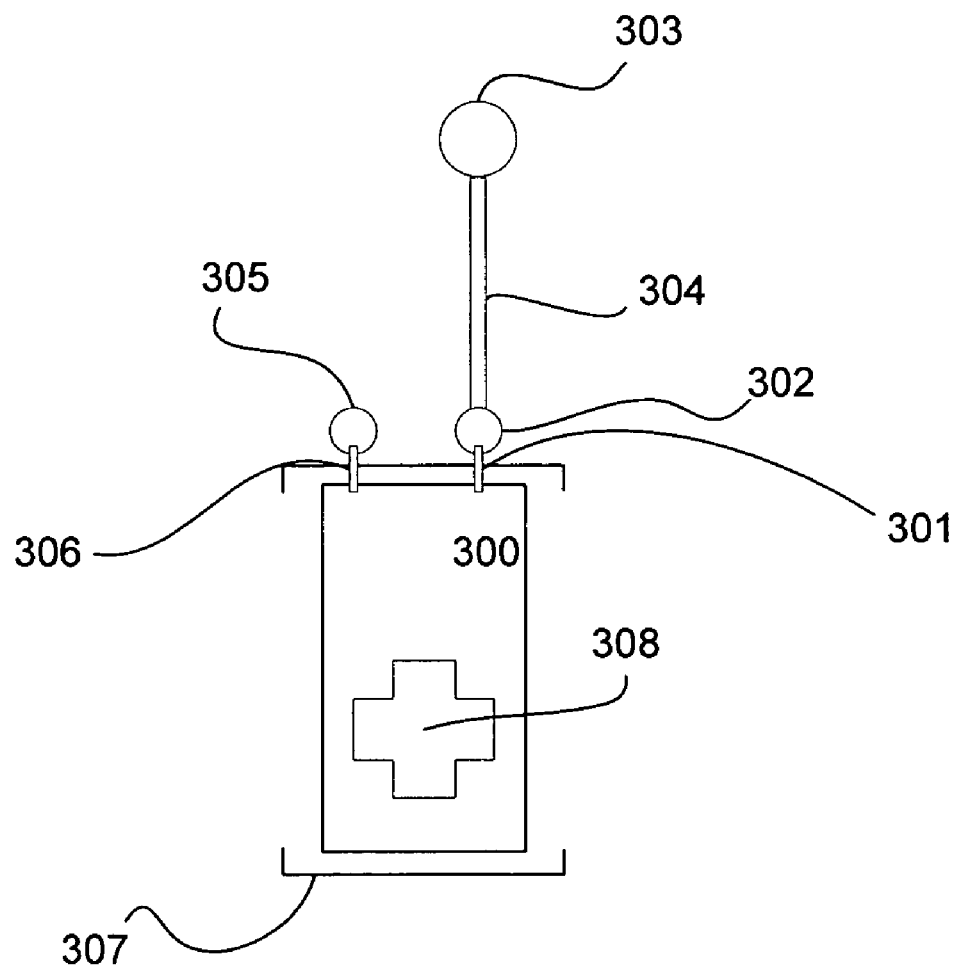
FIGS. 3 and 3A illustrate a nanotube array coupled with each tip in a separate microwell.
Figure 3A:
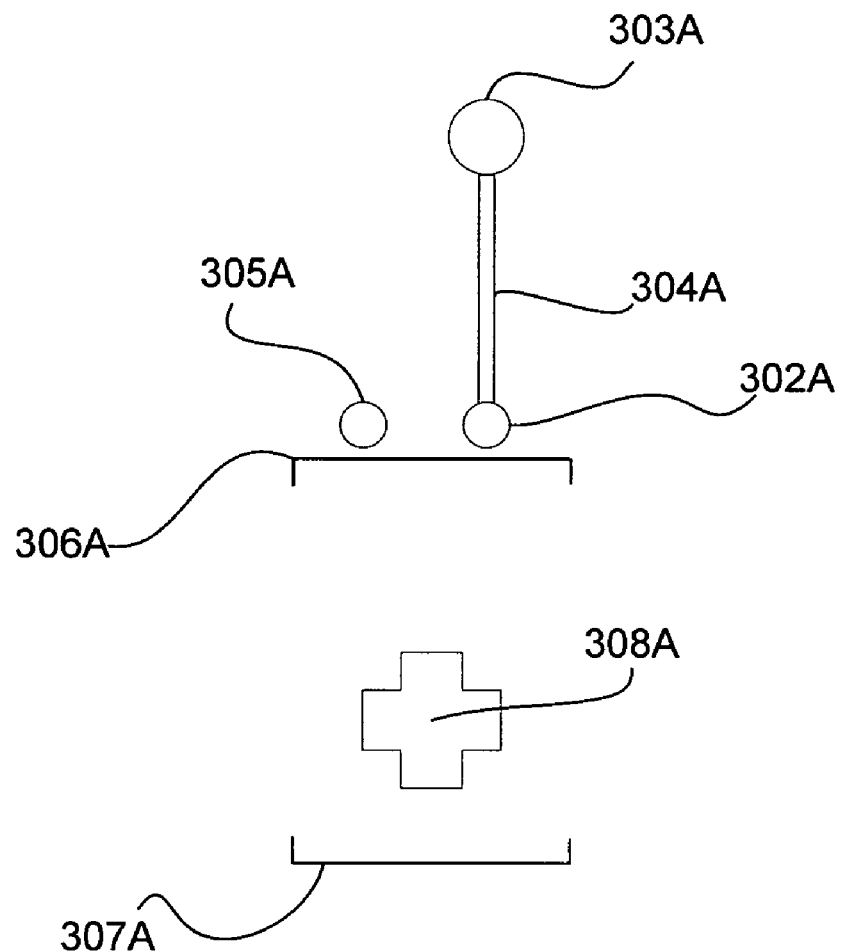

Referring now to FIG. 3 an illustration of a nanodip and array coupled with each tip in a separate microwell is provided and FIG. 3A provides a block diagram illustration of a nanodip without array coupled to it. As illustrated, an AFM chip 300 has a cantilever with a tip 306 in a dry microwell 305 to protect the tip 306. A micropipette fluid injection microwell 303 is in fluid communication through a microfluidic channel 304 with a cantilever with tip 301 in a fluid microwell 302. An alignment feature 307-308 can also be available in some embodiments.

FIG. 3A illustrates a dry microwell 305A and a fluid containing microwell 302A without the array coupled to it. The alignment feature 307A-308A is also illustrated as well as the microfluidic channel 304A and the micropipette fluid injection macro well 303A.

Another aspect if the invention provides the ability to laterally move a sample imaged with an unmodified probe under the modified probe and then form a composite of the two images generated. A manual laser adjustment can be useful to create the different images, wherein in some embodiments, human interaction can dictate a low positional accuracy. After each image is captured, the two can be superimposed offline to yield the composite image necessary for the proof-of-concept. It should be noted that because SAMs are typically topographically flat, in some embodiments, a composite image can be made to only include a chemically modified image. Interesting uses of the composite image can be derived from the superposition of chemical data onto 3-D structures, thus yielding regions of chemically active structures.

In some embodiments wherein carboxyl groups are not present at the nanotube tip ends, then attention can be focused on the nanotube etching procedure. In various embodiments, different oxidizing conditions can be used including, b way of example, higher temperature, exposure to larger oxygen partial pressures, and exposure to oxygen plasma, to yield free carboxyl groups. Alternatively, a voltage can be applied to a conducting surface that is in contact with the tips.

In another aspect, in some embodiments, a laser can be reflected off of the backside of the cantilever in an AFM, which in turn is attached to a probe. The laser thereby becomes an element responsible for actually tracking the cantilever and generating the appropriate positional data. When cantilevers are switched to facilitate the creation of the two different images, the laser, via a mirror adjustment, can be targeted at the second cantilever, which is accomplished by a series of screw adjustments. The screws are part of an outer shell that accommodates the tip holder. Thus, the screws are indirectly linked with the position of the tip itself.

In addition, multiple cantilevers can be tracked through the use of multiple lasers or a laser beam split to reflect off of the multiple cantilevers. A detector can be associated with each of the respective cantilevers such that each cantilever position can be tracked through monitoring each of the detectors.

Systems

In general, the methods of the present invention may be implemented with industrial deposition machinery, such as spin coating machinery, suitable for applying layers of material on a conductor surface. In addition, the present invention includes an automated processor programmed to cause apparatus to execute the methods described herein. Executable software that may be used in conjunction with various aspects of the present invention, can include, for example, computer aided design software such as: AnsyS™, CoventorWare™, Intellisuite™, and AutoCad™.

In some embodiments, therefore, a controller that can be used to control equipment and implement various embodiments of the present invention, as described herein. The controller can include one or more processors coupled to a communication device configured to communicate via a communications buss or a communication network with one or more of various components of a computer system or automated manufacturing equipment or production equipment. The communication device may be used to communicate, for example, with one or more items of fabrication equipment used to implement the steps described above.

The processor is also in communication with a storage device. The storage device may comprise any suitable information storage device, including combinations of magnetic storage devices (e.g., magnetic tape and hard disk drives), optical storage devices, and/or semiconductor memory devices such as Random Access Memory (RAM) devices and Read Only Memory (ROM) devices.

The storage device can store program code for controlling the processor. The processor performs instructions according to the stored program code, and thereby operates in accordance with the present invention. For example, the processor may receive instructions from the stored program code instructing the processor to control one or more of: spin casting equipment, deposition equipment and etching equipment. The processor may also transmit information comprising conditions under which the steps described herein are implemented.

The storage device can store probe manufacturing related data in a database, and other data as needed. The description of the control processor presented herein is exemplary, and any number of other data processing or controller arrangements can be employed besides those suggested by the figures.

CONCLUSION

A number of embodiments of the present invention have been described. Nevertheless, it will be understood that various modifications may be made without departing from the spirit and scope of the invention. For example, various methods or equipment may be used to implement the steps described herein. In addition, the methods of analysis described herein can be used to provide tools for research which aid in pathway determination, rational drug design, lead compound optimization and validation and accelerate drug discovery through direct time and cost savings. Accordingly, other embodiments are within the scope of the following claims.

What is claimed is:

1. An apparatus for biological interrogations, the apparatus comprising:
    an atomic force microscope chip; and
    an array of two or more nanostructure tips operatively attached to the atomic force microscope chip, wherein at least one nanostructure tip in the array is not chemically modified by a predetermined ligand and one or more nanostructure tips in the array are chemically modified, and wherein the modified nanostructure tip is modified with a predetermined ligand.

2. The apparatus of claim 1 additionally comprising a microwell for containing the ligand with which the nanostructure tip is modified.

3. The apparatus of claim 2 additionally comprising a laser element operative to track cantilever movement and a laser control operative to generate positional data.

4. The apparatus of claim 3 additionally comprising a microfluidic channel for conducting a fluid used to modify a nanostructure tip to a corresponding microwell.

5. The apparatus of claim 3 additionally comprising:
    a support substrate supporting an alignment apparatus for aligning the array of probes with corresponding microwells; and
    a stage supporting the substrate and operative to impart axis motion to the substrate.

* * * * *